United States Patent
Li et al.

(10) Patent No.: US 11,315,271 B2
(45) Date of Patent: Apr. 26, 2022

(54) POINT CLOUD INTENSITY COMPLETION METHOD AND SYSTEM BASED ON SEMANTIC SEGMENTATION

(71) Applicant: Tsinghua University, Beijing (CN)

(72) Inventors: Jun Li, Beijing (CN); Xinyu Zhang, Beijing (CN); Zhiwei Li, Beijing (CN); Zhenhong Zou, Beijing (CN); Yi Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/485,402

(22) Filed: Sep. 25, 2021

(65) Prior Publication Data
US 2022/0101548 A1    Mar. 31, 2022

(30) Foreign Application Priority Data

Sep. 30, 2020 (CN) .......................... 202011060052.X

(51) Int. Cl.
*G06T 3/40*       (2006.01)
*G06T 3/60*       (2006.01)
(Continued)

(52) U.S. Cl.
CPC ............ *G06T 7/521* (2017.01); *G06T 3/4007* (2013.01); *G06T 3/60* (2013.01); *G06T 5/50* (2013.01);
(Continued)

(58) Field of Classification Search
CPC .......... G06T 3/4007; G06T 3/60; G06T 5/50; G06T 7/11; G06T 7/187; G06T 7/521;
(Continued)

(56) References Cited

U.S. PATENT DOCUMENTS 10,740,897 B2    8/2020   Chen et al.
2016/0086318 A1*  3/2016   Hannuksela ............ G01S 17/36
                                                       348/43
(Continued)

FOREIGN PATENT DOCUMENTS

CN    105260737 A    1/2016
CN    107862293 A    3/2018
(Continued)

OTHER PUBLICATIONS

Asvadi et al. ("Multimodal vehicle detection: fusing 3D-LIDAR and color camera data," Pattern Recognition Letters 115 (2018); available online Sep. 28, 2017) (Year: 2017).*

(Continued)

*Primary Examiner* — Yubin Hung
(74) *Attorney, Agent, or Firm* — Bayramoglu Law Offices LLC

(57) ABSTRACT

A point cloud intensity completion method and system based on semantic segmentation are provided. The point cloud intensity completion method includes: acquiring an RGB image and point cloud data of a road surface synchronously by a photographic camera and a lidar; performing spatial transformation on the point cloud data by using a conversion matrix to generate a two-dimensional reflection intensity projection map and a two-dimensional depth projection map; performing reflection intensity completion on the RGB image and the two-dimensional reflection intensity projection map to obtain a single-channel reflection intensity projection map; performing depth completion on the RGB image and the two-dimensional depth projection map to obtain a single-channel depth projection map; and performing coarse-grained completion on the RGB image, the single-channel reflection intensity projection map and the (Continued)

single-channel depth projection map to obtain a two-dimensional coarse-grained reflectance intensity projection map.

7 Claims, 3 Drawing Sheets

(51) Int. Cl.
    *G06T 5/50*     (2006.01)
    *G06T 7/11*     (2017.01)
    *G06T 7/187*     (2017.01)
    *G06T 7/521*     (2017.01)

(52) U.S. Cl.
    CPC ............... *G06T 7/11* (2017.01); *G06T 7/187* (2017.01); *G06T 2207/10024* (2013.01); *G06T 2207/10028* (2013.01); *G06T 2207/20084* (2013.01); *G06T 2207/30252* (2013.01)

(58) Field of Classification Search
    CPC . G06T 2207/10024; G06T 2207/10048; G06T 2207/20084; G06T 2207/30252
    See application file for complete search history.

(56) References Cited

U.S. PATENT DOCUMENTS

| | | | |
|---|---|---|---|
| 2019/0056501 A1 | | 2/2019 | Yu et al. |
| 2020/0301013 A1* | | 9/2020 | Banerjee ............... G01S 13/865 |

FOREIGN PATENT DOCUMENTS

| | | | |
|---|---|---|---|
| CN | 108230329 A | | 6/2018 |
| CN | 108242064 A | | 7/2018 |
| CN | 108415032 A | | 8/2018 |
| CN | 108541322 A | | 9/2018 |
| CN | 109064533 A | | 12/2018 |
| CN | 109447923 A | | 3/2019 |
| CN | 109949372 A | | 6/2019 |
| CN | 110827202 A | * | 2/2020 |
| CN | 110853075 A | * | 2/2020 |
| CN | 111080659 A | * | 4/2020 |
| CN | 111145174 A | | 5/2020 |
| CN | 111161202 A | | 5/2020 |
| CN | 111210518 A | | 5/2020 |
| CN | 111274976 A | | 6/2020 |
| CN | 111462237 A | * | 7/2020 |
| CN | 111507982 A | | 8/2020 |
| CN | 111553859 A | | 8/2020 |
| CN | 111583390 A | | 8/2020 |

OTHER PUBLICATIONS

Du et al. ("Car Detection for Autonomous Vehicle: LIDAR and Vision Fusion Approach Through Deep Learning Framework," IEEE International Conference on Intelligent Robots and Systems, Sep. 24-28, 2017) (Year: 2017).*

Schlosser et al. ("Fusing LIDAR and Images for Pedestrian Detection using Convolutional Neural Networks," IEEE International Conference on Robotics and Automation, May 16-21, 2016) (Year: 2016).*

Mundhenk et al. ("Frame Rate Fusion and Upsampling of EO/LIDAR Data for Multiple Platforms," IEEE Conference on Computer Vision and Pattern Recognition Workshops; Date of Conference: Jun. 23-28, 2014) (Year: 2014).*

Madawi et al. ("RGB and LiDAR fusion based 3D Semantic Segmentation for Autonomous Driving," IEEE Intelligent Transportation Systems Conference; Date of Conference: Oct. 27-30, 2019) (Year: 2019).*

Van Gansbeke et al. ("Sparse and Noisy LiDAR Completion with RGB Guidance and Uncertainty," 16th International Conference on Machine Vision Applications; Date of Conference: May 27-31, 2019) (Year: 2019).*

Jian Li, et al., Ground laser point cloud semantic segmentation based on multi-feature deep learning, Science of Surveying and Mapping, 2021, pp. 133-139, 162, vol. 46 No. 3.

Zhang Xinyu, et al.. Deep multi-modal fusion in object detection for autonomous driving, CAAI Transactions on Intelligent Systems, 2020, vol. 15 No. 4.

* cited by examiner

POINT CLOUD INTENSITY COMPLETION METHOD AND SYSTEM BASED ON SEMANTIC SEGMENTATION

CROSS REFERENCE TO THE RELATED APPLICATIONS

This application is based upon and claims priority to Chinese Patent Application No. 202011060052.X filed on Sep. 30, 2020, the entire contents of which are incorporated herein by reference.

TECHNICAL FIELD

The present invention relates to the field of unmanned driving technology, in particular to a point cloud intensity completion method and system based on semantic segmentation.

BACKGROUND

Lidars are main tools for data acquisition in unmanned driving. Lidars on roofs of unmanned vehicles are generally 16/32/64/128-line lidars. The cost of a lidar increases with the number of beams, but a lidar with fewer beams collects fewer point clouds, and sparse point clouds are difficult to use in high precision calculations.

In addition, the energy of a light beam returned to the lidar is influenced by the distance and the propagation medium during the actual acquisition. An object at a long distance cannot return a beam or returns a beam with energy lower than a detection threshold. In addition, due to the influence of microscopic particles in the atmosphere, meteorological conditions such as rain, snow and fog may cause a loss of energy of a beam emitted by the lidar, resulting in that an object cannot return a beam or returns a beam with energy lower than the detection threshold. In the two situations, eventually a receiver cannot receive a signal, or receives a signal that is weakened or with noise.

Point cloud completion work at present mainly has the following limitations: (1) it is limited to point cloud completion of a local object, in particular to completion of an indoor scenario or a single object; (2) it is limited to local dependent completion, i.e., interpolation based on adjacent regions, and lacks reference to regions with the same semantics in a larger range; (3) in completion work of a large overall scenario, the focus is on depth completion work, while less research is done for reflection intensity completion work. However, reflection intensity values may reflect different physical attributes between objects, such as a vehicle body and a wheel, and a road and a tree trunk. Second, completed reflection intensity values may provide more effective information for semantic segmentation or instance segmentation in a downstream task and improve the accuracy of the downstream task.

Before introduction of embodiments of the invention, first, relevant terms involved in the embodiments of the invention are explained as follows.

Point cloud: point data about the appearance surface of an object obtained by a measuring instrument such as a lidar, each point data including x, y, z coordinates, depth and reflection intensity information.

RGB image: a color image acquired by a monocular photographic camera, as a three-channel image.

Two-dimensional point cloud reflection intensity projection map: a two-dimensional projection map obtained by projecting a point cloud acquired by a lidar onto a plane where a grayscale image is located, as a single-channel image, with values being reflection intensity values of corresponding points in a point cloud.

Two-dimensional point cloud depth projection map: a two-dimensional projection map obtained by projecting a point cloud acquired by a lidar onto a plane where a grayscale image is located, as a single-channel image, with values being depth values of corresponding points in a point cloud.

Label: a category label for supervised training of a neural network based on semantic segmentation, with a category labeled for each pixel point.

SUMMARY

An object of the present invention is to overcome the shortcomings of the prior art, and provide a point cloud intensity completion method and system based on semantic segmentation.

To achieve the above-mentioned object, the present invention proposes a point cloud intensity completion method based on semantic segmentation, the method including:

step 1) acquiring an RGB image of a road surface by a photographic camera, and synchronously acquiring point cloud data of the road surface by a lidar;

step 2) performing spatial transformation on the point cloud data by using a conversion matrix between a lidar coordinate system and a photographic camera imaging coordinate system to generate a two-dimensional reflection intensity projection map and a two-dimensional depth projection map;

step 3) performing feature stitching and reflection intensity completion on the RGB image and the two-dimensional reflection intensity projection map to obtain a single-channel reflection intensity projection map; performing feature stitching and depth completion on the RGB image and the two-dimensional depth projection map to obtain a single-channel depth projection map; and performing feature stitching and coarse-grained completion on the RGB image, the single-channel reflection intensity projection map and the single-channel depth projection map to obtain a two-dimensional coarse-grained reflection intensity projection map;

step 4) performing feature stitching and semantic segmentation on the RGB image and the two-dimensional depth projection map to obtain a plurality of regions to be completed; and step 5) performing fine-grained reflection intensity completion on the two-dimensional coarse-grained reflection intensity projection map according to the regions to be completed to obtain a two-dimensional reflection intensity projection completion map.

As an improvement of the above-mentioned method, step 2) specifically includes:

projecting the point cloud data to a two-dimensional image plane by using the conversion matrix between the lidar coordinate system and the photographic camera imaging coordinate system, with pixel values being reflection intensity values, to obtain the two-dimensional reflection intensity projection map; and projecting the point cloud data to a two-dimensional grayscale image plane by using the conversion matrix between the lidar coordinate system and the photographic camera imaging coordinate system, with pixel values being depth values, and vacant parts being filled with a value 0, to obtain the two-dimensional depth projection map, wherein the depth value $D_i^*$ of the i th point is:

$$D_i^* = \sqrt{x_i^2 + y_i^2}$$

where $(x_i, y_i)$ is coordinate values of the ith point in the point cloud data.

As an improvement of the above-mentioned method, the step 3) specifically includes:

step 301) cropping the RGB image to obtain an RGB image of a size (352,1216,3), cropping the two-dimensional reflection intensity projection map to obtain a two-dimensional reflection intensity projection map of a size (352, 1216,1), and performing feature stitching on the two cropped images to obtain a two-dimensional reflection intensity stitched image of a size (352,1216,4);

step 302) inputting the two-dimensional reflection intensity stitched image into a pre-built and trained coarse-grained reflection intensity completion sub-model to obtain a single-channel reflection intensity projection map;

step 303) cropping the RGB image to obtain an RGB image of a size (352,1216,3); cropping the two-dimensional depth projection map to obtain a two-dimensional depth projection map of a size (352,1216,3); and performing feature stitching on the two cropped images to obtain a two-dimensional depth stitched image of a size (352,1216, 3);

step 304) inputting the two-dimensional depth stitched image into a pre-built and trained depth completion sub-model to obtain a single-channel depth projection map; and step 305) performing coarse-grained reflection intensity fusion on the RGB image, the single-channel reflection intensity projection map and the single-channel depth projection map, to obtain a two-dimensional coarse-grained reflection intensity projection map.

As an improvement of the above-mentioned method, an input to the coarse-grained reflection intensity completion sub-model is the stitched image of a size (352,1216,4), and an output therefrom is the single-channel reflection intensity projection map of a size (352,1216), the model being a self-supervised model including an encoder and a decoder both with a ResNet network structure, in which an activation function is a ReLU function, and a loss function $Loss_{rc}$ on reflection intensity is:

$$Loss_{rc} = \frac{1}{n}\sum_i \|R_i - R_i^*\|_2^2$$

where n is the number of pixel points with effective reflection intensity values, i is a pixel point with a reflection intensity value, $R_i^*$ is a predicted value of reflection intensity of the point i by the coarse-grained reflection intensity completion sub-model, and $R_i^*$ is a truth value of the reflection intensity of the point i.

As an improvement of the above-mentioned method, an input to the depth completion sub-model is the two-dimensional depth stitched image of a size (352,1216,4), and an output therefrom is the single-channel depth projection map of a size (352,1216,1), the model being a self-supervised model including an encoder and a decoder both with a ResNet network structure, in which an activation function is a ReLU function, and with a surface normal as an intermediate constraint, a depth completion loss function $Loss_{dc}$ is:

$$Loss_{dc} = \lambda_1 Loss_{normal} + \lambda_2 Loss_{depth}$$

where $Loss_{normal}$ is a loss function of the intermediate constraint surface normal, $Loss_{depth}$ is a loss function of depth, $\lambda_1$ is a weight of $Loss_{normal}$, and $\lambda_2$ is a weight of $Loss_{depth}$, $$Loss_{normal} = \frac{1}{n}\sum_i N_i - N_i^*$$

$$Loss_{depth} = \frac{1}{n}\sum_i d_i^2 - \frac{1}{2n^2}\left(\sum_i d_i\right)^2 + \frac{1}{n}\sum_i [(\nabla_x d_i)^2 + (\nabla_y d_i)^2]$$

$$d_i = D_i - D_i^*$$

where $N_i$ is a predicted value of the surface normal of the depth completion sub-model, $N_i^*$ is a true value of the surface normal, n is the total number of effective pixel value points, i is a point with a pixel value, $D_i$ is a depth value of the i th point predicted by the depth completion sub-model, $D_i^*$ is a depth true value of the i th point, $d_i$ is an error between the depth true value the i th point and the depth value predicted by the depth completion sub-model, $\nabla_x d_i$ is a derivative of $d_i$ with respect to a direction x, and $\nabla_y d_i$ is a derivative of $d_i$ with respect to a direction y.

As an improvement of the above-mentioned method, a loss function Loss of the coarse-grained reflection intensity fusion is:

$$Loss = Loss_{dc} + \lambda_3 Loss_{rc} = \lambda_1 Loss_{normal} + \lambda_2 Loss_{depth} + \lambda_3 Loss_{rc}$$

where $\lambda_3$ is a weight coefficient of the loss function $Loss_{rc}$ on reflection intensity.

As an improvement of the above-mentioned method, step 4) specifically includes:

cropping the RGB image to obtain an RGB image of a size (352,1216,3);

cropping the two-dimensional depth projection map to obtain a two-dimensional depth projection map of a size (352,1216,1);

performing feature stitching on the two cropped images to obtain a two-dimensional depth stitched image of a size (352,1216,4);

inputting the two-dimensional depth stitched image into a pre-built and trained semantic segmentation model to obtain a classification result of a size (352,1216,10), where 10 indicates that the number of layers of categories predicted by the semantic segmentation is 10, the value of each point on each layer of channel being a probability value of a label, ranging from 0 to 1, and the sum of the values of the same point on the 10 layers being 1; and among 10 probability values of each pixel point, selecting a category corresponding to the largest probability value as a corresponding label in the semantic segmentation, differentiating different semantics on the image by colors, and extracting labeled regions with a same color to obtain the regions to be completed.

As an improvement of the above-mentioned method, in the semantic segmentation model, a softmax function is used as a classification function, and a loss function $Loss_{sementic}$ is a cross-entropy function:

$$Loss_{sementic} = -\frac{1}{n}\sum_{i=1}^{n}\sum_{j=1}^{m} C_{i,j}^* \log(C_{i,j})$$

$$C_{i,j} = \frac{e^{Z_{i,j}}}{\sum_m e^{Z_{i,j,m}}}$$

where n is the number of effective pixel points, m is the number of label categories of semantic segmentation, $C_{i,j}$ is a probability that a pixel point i belongs to the jth category based on the semantic segmentation, $C_{i,j}^*$ is a true probability that the pixel point i belongs to the jth category, and $Z_{i,j}$ is an output result of the pixel point i at the jth node of the last layer of a neural network.

As an improvement of the above-mentioned method, step 5) specifically includes:

aligning the regions to be completed with the two-dimensional coarse-grained reflection intensity projection map respectively, and under semantic guidance, creating reflection intensity to-be-completed-regions with the same size as a semantic segmentation label map, wherein points with reflection intensity values are denoted as 1, and points without reflection intensity values are denoted as 0;

for points denoted as 0 in each region to be completed, letting a pixel point be i, coordinates of which are (x,y) and a reflection intensity value of which is r(x,y);

if the point is a point on the boundary of the region to be completed, extracting an edge from the semantic segmentation label map by using a canny operator of OpenCV™ as an edge of a completed region, and performing interpolation by using two adjacent points on the edge and a point inside the region, the three points being denoted as $(x_1,y_1)$, $(x_2,y_2)$, and $(x_3,y_3)$, respectively, to obtain an interpolation result:

$$r(x, y) = \sum_{i=1}^{3} \frac{l_i}{\sum_{i=1}^{3} l_i} r(x_i, y_i), l_i = \sqrt{(x-x_i)^2 + (y-y_i)^2} \ ;$$

and if the point is a point inside the region to be completed, performing interpolation using a bilinear interpolation method: selecting two points $(x_1,y_1)$ and $(x_2,y_2)$ nearest to the point and forming a rectangular region by expansion using the two points, and correspondingly, selecting vertex positions of the rectangle, $(x_1,y_1)$, $(x_1,y_2)$, $(x_2,y_1)$, $(x_2,y_2)$, respectively, to obtain an interpolation result:

$$r(x, y) = \frac{1}{(x_2 - x_1)(y_2 - y_1)} [x_2 - x \quad x - x_1] \begin{bmatrix} r(x_1, y_1) & r(x_1, y_2) \\ r(x_2, y_1) & r(x_2, y_2) \end{bmatrix} \begin{bmatrix} y_2 - y \\ y - y_1 \end{bmatrix}.$$

A point cloud intensity completion system based on semantic segmentation includes a photographic camera, a lidar, a point cloud data pre-processing module, a coarse-grained reflection intensity completion module, a semantic segmentation module, and a fine-grained reflection intensity completion module, wherein the photographic camera is configured to acquire an RGB image of a road surface;

the lidar is configured to synchronously acquire point cloud data of the road surface;

the point cloud data pre-processing module is configured to perform spatial transformation on the point cloud data by using a conversion matrix between a lidar coordinate system and a photographic camera imaging coordinate system to generate a two-dimensional reflection intensity projection map and a two-dimensional depth projection map;

the coarse-grained reflection intensity completion module is configured to perform feature stitching and reflection intensity completion on the RGB image and the two-dimensional reflection intensity projection map to obtain a single-channel reflection intensity projection map; perform feature stitching and depth completion on the RGB image and the two-dimensional depth projection map to obtain a single-channel depth projection map; and perform coarse-grained completion on the RGB image, the single-channel reflection intensity projection map and the single-channel depth projection map to obtain a two-dimensional coarse-grained reflection intensity projection map;

the semantic segmentation module is configured to perform feature stitching and semantic segmentation on the RGB image and the two-dimensional depth projection map to obtain a plurality of regions to be completed; and the fine-grained reflection intensity completion module is configured to perform fine-grained reflection intensity completion on the two-dimensional coarse-grained reflection intensity projection map according to the regions to be completed to obtain a two-dimensional reflection intensity projection completion map.

Compared with the prior art, the jet present invention has the following advantages:

the method of the present invention can simultaneously accomplish depth completion, semantic segmentation, and reflection intensity completion, and output a depth completion map, a semantic segmentation image and a reflection intensity completion map;

in the method of the present invention, a mapping relationship between point cloud depth information and reflection intensity information is modeled based on physical properties and a deep learning method, the depth information is completed by using a depth image and an RGB image, and a dense point cloud three-dimensional spatial structure is reconstructed, thus providing more complete information for reflection intensity completion; and the method of the present invention uses semantic segmentation to determine regions to be completed, overcomes the problem of local dependence caused by an interpolation algorithm, and can accurately and effectively complete reflection intensity by virtue of guidance information of semantic segmentation, thus improving the reflection intensity completion accuracy.

DETAILED DESCRIPTION OF THE EMBODIMENTS

Lidar reflection intensity completion involved in the present invention includes two aspects of work: point cloud completion on the one hand, and reflection intensity value completion on the other hand. For the two aspects of work, a novel idea is to mine spatial features of data in various modalities based on multimodal data. For example, an RGB image can provide edge information and texture information with high accuracy, and point cloud data can provide depth information. Furthermore, both depth completion and reflection intensity completion can be achieved in multimodal data fusion.

The present invention provides a point cloud intensity completion method based on semantic segmentation, including steps of:

1. acquiring an RGB image and four-dimensional point cloud data containing spatial information and reflection intensity information on the road surface by using a monocular photographic camera and a lidar;
2. performing spatial transformation on a point cloud according to the lidar point cloud data, based on calibration results of the radar and the photographic camera, to generate a single-channel two-dimensional reflection intensity projection map and depth projection map;
3. performing point cloud completion and coarse-grained reflection intensity completion based on the RGB image, the two-dimensional reflection intensity projection map, and the two-dimensional depth projection map, to obtain a two-dimensional reflection intensity projection map after coarse-grained completion;
4. performing semantic segmentation based on the RGB image and the two-dimensional depth projection map, to obtain regions to be completed; and
5. fusing edge data after the semantic segmentation and the coarse-grained reflection intensity projection map, performing fine-grained lidar reflection intensity completion for the regions to be completed, and outputting a two-dimensional reflection intensity projection map.

The technical solution of the present invention will be described in detail below in conjunction with the accompanying drawings and embodiments.

Embodiment 1

Figure 1:
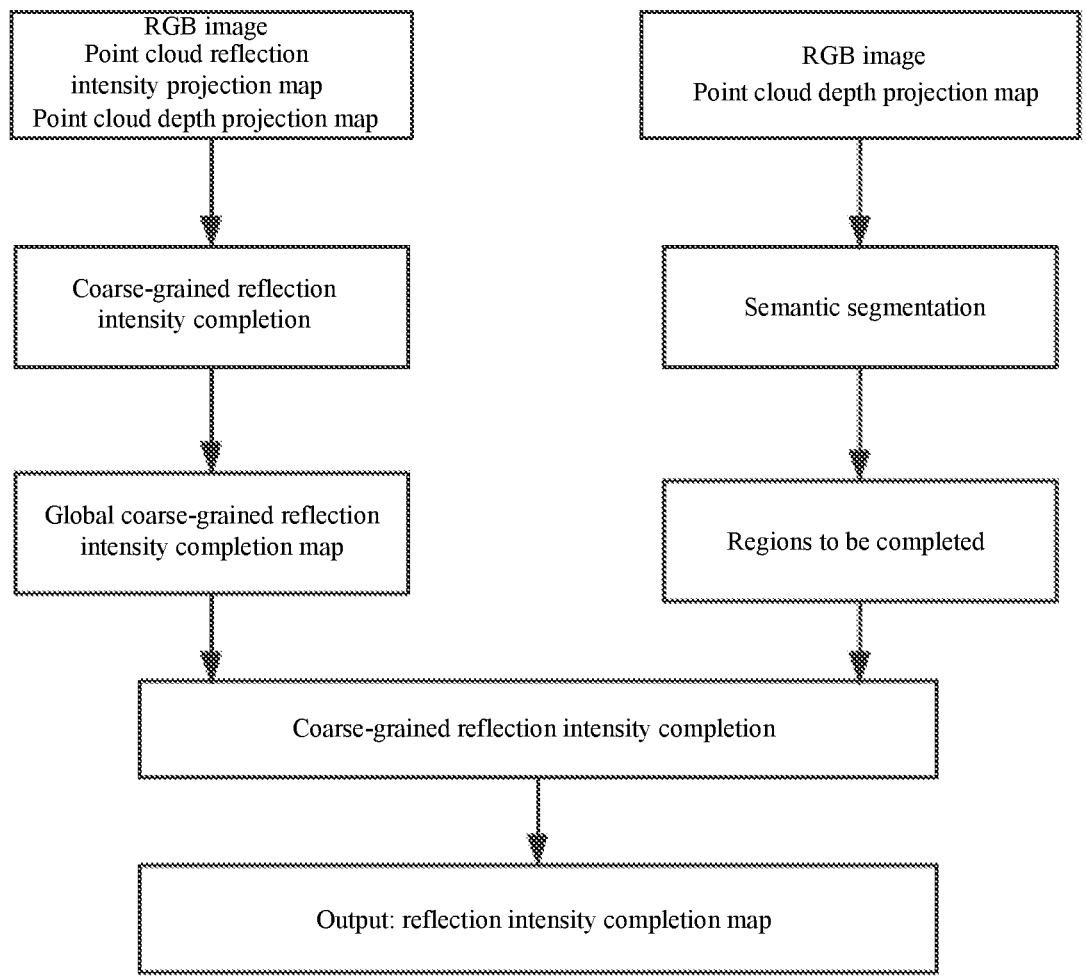
FIG. 1 is a flow diagram of a point cloud intensity completion method based on semantic segmentation in Embodiment 1 of the present invention.

As shown in FIG. 1, Embodiment 1 of the present invention provides a point cloud intensity completion method based on semantic segmentation, specific implementing steps of which are as follows:

Step 1) A three-channel RGB image and point cloud data of a same scenario are acquired respectively by a monocular photographic camera and a lidar. This step specifically includes the following steps:

Step 101) An RGB image CI of road conditions is acquired by a vehicle-mounted monocular photographic camera.

A forward-facing monocular photographic camera or a forward-facing monocular camera mounted on a traveling vehicle is used to acquire image information of a scenario ahead. The forward-facing monocular photographic camera acquires road image information directly in front of the traveling vehicle in a driving direction thereof and above the road surface. That is, the acquired road image information is a perspective view corresponding to acquired information directly in front of the vehicle in the driving direction thereof and above the road surface.

Step 102) Point cloud data PC of the road conditions is acquired by a vehicle-mounted lidar.

In this embodiment, the scenario image information and scenario point cloud information are acquired synchronously. That is, after the lidar and the forward-facing monocular photographic camera are mounted and configured on the traveling vehicle, their relative position attitudes are calibrated, and road data information acquisition is started on the same road surface at the same time.

For ease of calculation, a point cloud involved in the following embodiment of the present invention is a part of a 360° point cloud that is directly in front of the vehicle, i.e., in a direction where the image is located. Moreover, since the photographic camera and the lidar are already calibrated, a conversion matrix of projecting the point cloud to a pixel plane may be determined to facilitate subsequent processing of the point cloud information and the image information.

The calibration of the photographic camera is implemented by Zhang's calibration method, in which first a photographic camera coordinate system and a world coordinate system are set, and using an image of the photographic camera on a checkerboard placed at a preset position, two-dimensional coordinates of corner point positions of the checkerboard in the image are calculated, and then a transformation matrix is calculated with real three-dimensional coordinates of the corner points of the checkerboard; and for the calibration of the lidar, first a lidar coordinate system and a real world coordinate system are set, a number of obstacles are placed at a preset position and aligned for lidar scanning, and a transformation matrix of the two coordinate systems is calculated by using coordinates of a point cloud obtained from the obstacles in the lidar coordinate system and coordinates of the obstacles in the real world coordinate system, and other parameters, including the scanning resolution and scanning speed of the lidar, and time alignment between the lidar and the photographic camera, can be obtained from respective hardware information and measurements at the time of installation. The calibrations result in an interconversion matrix between the world coordinate system and the photographic camera imaging coordinate system, and an interconversion matrix between the world coordinate system and the lidar coordinate system.

Step 2) A two-dimensional single-channel reflection intensity projection map and depth projection map is acquired based on the point cloud data PC. This step includes the following steps:

Step 201) The point cloud PC is projected from a three-dimensional coordinate system to a plane of a two-dimensional grayscale image, with pixel values being reflection intensity values PDR.

Specifically, considering that the lidar and the forward-facing camera are already calibrated, and the conversion matrix $K_1$ between the lidar three-dimensional coordinate system and the world three-dimensional coordinate system, and the conversion matrix $K_2$ between the photographic camera two-dimensional imaging coordinate system and the world three-dimensional coordinate system are obtained according calibration parameters, suppose there is a point P in the world coordinate system, with corresponding three-dimensional coordinates $X_0$ in the world coordinate system, corresponding three-dimensional coordinates $X_1$ in the lidar coordinate system where the point cloud is located is, and two-dimensional coordinates U in the photographic camera imaging coordinate system, then $U=K_2 \cdot X_0$, $X_1=K_1 \cdot X_0$ and thus $U=K_2 \cdot K_1^{-1} \cdot X_0$. Then, a part at a corresponding position and with a same size as the grayscale image is taken from a two-dimensional point cloud image, with the value of each pixel point being a corresponding reflection intensity value, and vacant parts being filled with a value 0. In this way, the lidar point cloud can be converted into a two-dimensional point cloud image corresponding to the grayscale image, denoted as PCR.

Step 202) Like in the above step, the point cloud PC is just projected from the three-dimensional coordinate system to the plane of the two-dimensional grayscale image, with the value of each pixel point being a depth value, where the depth value $D_i^*$ of the i th point is $D_i^*=\sqrt{x_i^2+y_i^2}$, where x and y are values of x and y in the point cloud data, and vacant parts being filled with a value 0. In this way, a depth projection image of the point cloud is obtained, denoted as PCD.

Figure 2:
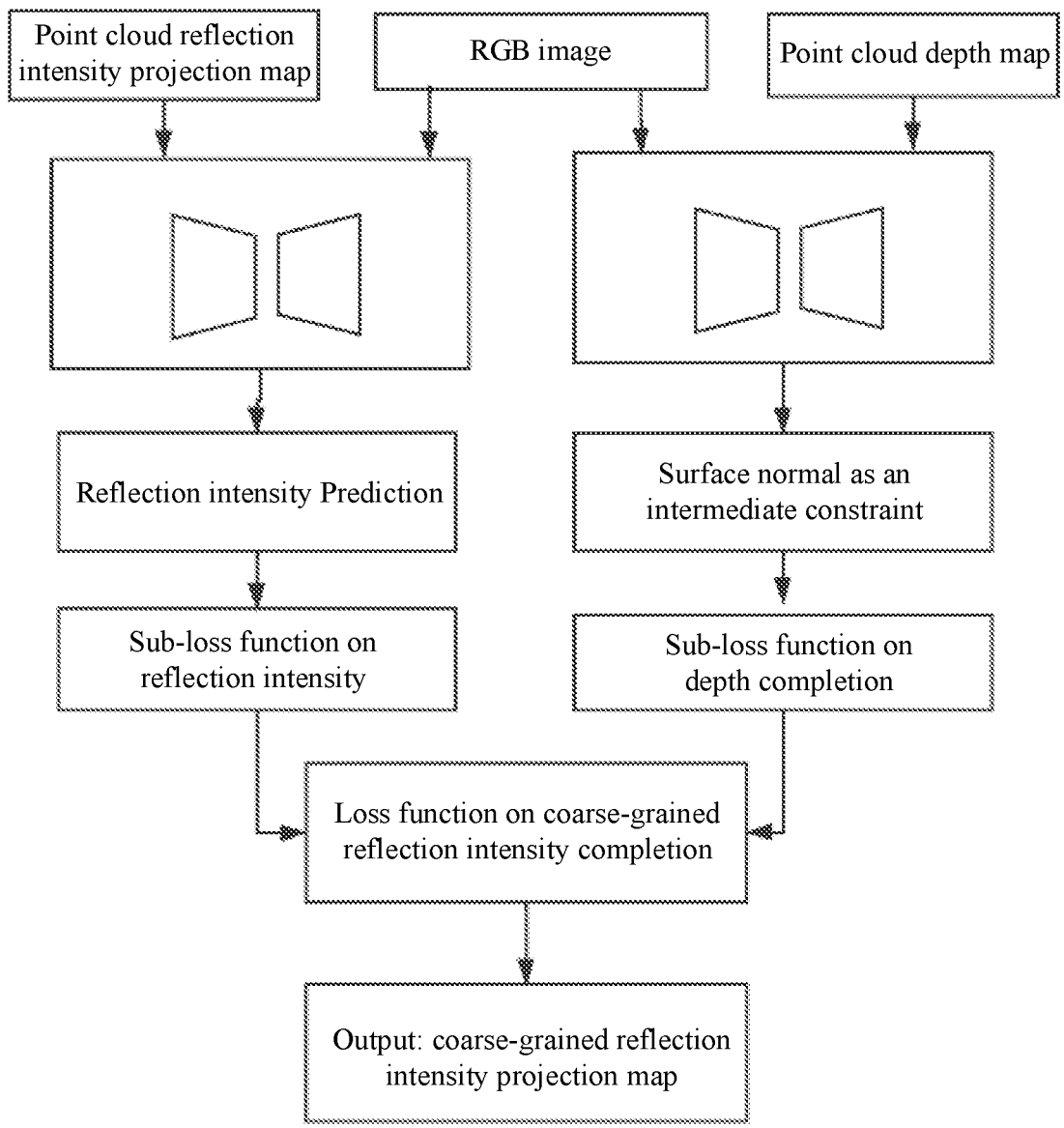
FIG. 2 is a flow diagram of coarse-grained reflection intensity completion by using an RGB image, a reflection intensity projection map, and a depth projection map, in Embodiment 1 of the present invention.

Step 3) The RGB image, the reflection intensity projection map PCR, and the depth projection map PCD are input to obtain point cloud completion and coarse-grained reflection intensity projection maps by using a self-supervised neural network; as shown in FIG. 2, two paths are involved, specifically including the following steps.

Step 301) Reflection intensity completion path: The RGB image CI, and the reflection intensity projection map PCR are input to a coarse-grained reflection intensity completion sub-model, and a point cloud reflection intensity projection image PCR1 is output.

Given that those skilled in the art should understand a training process of a neural network model, it is described as follows:

The coarse-grained reflection intensity completion sub-model may be any neural with a prediction function, or a semantic segmentation function, and an image generation function. Considering that point-by-point manual labeling of the reflection intensity of the point cloud is difficult to achieve in the actual scenario, the basic backbone of the neural network uses a self-supervised model, and input values thereto are used as supervised label values of the neural network. An exemplary training process of the neural network is described below.

Before the neural network is trained, the three-channel RGB image CI and the single-channel reflection intensity projection image PCR need to be preprocessed. The two images are both cropped to a size of (352,1216), such that the size of the single-channel reflection intensity projection image PCR is (352,1216,1), and the size of the three-channel RGB image is (352,1216,3), and features of the two images are stitched, such that the size of the input to the network is (352,1216,4). The size of a target output from the network is (352,1216,1).

The self-supervised neural network is implemented based on a tool PyTorch. Training is started after the sizes of an encoder and a decoder of the network, the amount of batch processing, the number of training rounds, the learning rate of each round and other hyperparameters that need to be defined artificially are set. The encoder calculates an implicit vector of an intermediate layer, and the decoder performs decoding to obtain an image. A ResNet network structure is used in each encoding block and decoding block. An error is calculated according to a loss function, and network parameters are updated by using a back propagation algorithm to complete the first round of training. The process continues until all rounds of training are completed. To speed up the training of the network, a ReLU function is used as an activation function of the network during the training of the network.

A loss function of the neural network for the coarse-grained reflection intensity completion path is:

$$Loss_{rc} = Loss_{reflectance} = \frac{1}{n}\sum_i \|R_i - R_i^*\|_2^2$$

where:
i: is a pixel point with a reflection intensity value;
n: is the number of pixel points with effective reflection intensity values;
$R_i$: is a predicted value of reflection intensity of the point i by the neural network;
$R_i^*$: is a true value of the reflection intensity of the point i; and
$Loss_{rc}$: is a loss function on reflection intensity.

Step 302) Point cloud completion path: The RGB image CI and the depth projection map PCD are input to a point cloud completion sub-module, and with a surface normal as an intermediate constraint, a depth projection completion map is output.

Similar to the processing process in step 301), before the neural network is trained, the three-channel RGB image CI and the single-channel depth projection image PCD need to be preprocessed. The two images are both cropped to a size of (352,1216), such that the size of the single-channel depth projection image PCD is (352,1216,1), and the size of the three-channel RGB image is (352,1216,3), and features of the two images are stitched, such that the size of the input to the network is (352,1216,4). The size of a target output from the network is (352,1216,1).

The self-supervised neural network is implemented based on a tool PyTorch. Training is started after the sizes of an encoder and a decoder of the network, the amount of batch processing, the number of training rounds, the learning rate of each round and other hyperparameters that need to be defined artificially are set. The encoder calculates an implicit vector of an intermediate layer, and the decoder performs decoding to obtain an image. A ResNet network structure is used in each encoding block and decoding block. An error is calculated according to a loss function, and network parameters are updated by using a back propagation algorithm to complete the first round of training. The process continues until all rounds of training are completed. To speed up the training of the network, a ReLU function is used as an activation function of the network during training of the network.

To ensure the accuracy of depth completion, a surface normal is used as an intermediate constraint, so a loss function of the neural network for the point cloud completion path is:

$$Loss_{rc} = \lambda_1 Loss_{normal} + \lambda_2 Loss_{depth}$$

$$Loss_{normal} = \frac{1}{n}\sum_i N_i - N_i^*$$

$$Loss_{depth} = \frac{1}{n}\sum_i d_i^2 - \frac{1}{2n^2}\left(\sum_i d_i\right)^2 + \frac{1}{n}\sum_i [(\nabla_x d_i)^2 + (\nabla_y d_i)^2]$$

$$d_i = D_i - D_i^*$$

wherein:
$D_i$: is a depth value predicted by the neural network;
$D_i^*$: is a true value of depth of a point i;
$d_i$: is an error between the true value of the depth of the point i and the depth value predicted by the neural network;
i is a point with a pixel value;
n is the total number of effective pixel value points;
$\nabla_x d_i$ s a derivative of an image difference with respect to a direction x;
$\nabla_y d_i$ is a derivative of an image difference with respect to a direction y;

$N_i$: is a predicted value of a surface normal of the neural network;

$N_i^*$: is a truth value of the surface normal;

$Loss_{normal}$: denotes a loss function on the intermediate constraint surface normal; and $Loss_{depth}$: denotes a loss function on depth;

Step 303) In combination with the two paths, the three-channel RGB image CI, the single-channel reflection intensity projection map PCR, and the single-channel depth projection map PCD are input to a coarse-grained reflection intensity model, and as shown in FIG. 2, the two paths in step 301) and step 302) are connected in parallel.

The neural network is trained under a total loss function, which is:

$$Loss = Loss_{dc} + \lambda_3 Loss_{rc} = \lambda_1 Loss_{normal} + \lambda_2 Loss_{depth} + \lambda_3 Loss_{reflectance}$$

Figure 3:
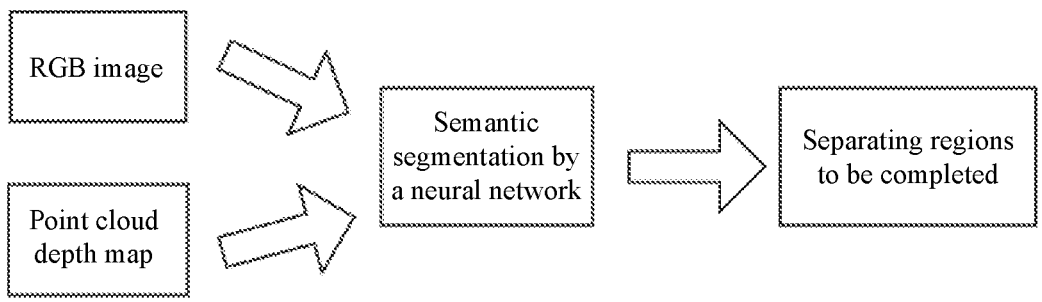
FIG. 3. is a flow diagram of performing semantic segmentation by using the RGB image and the depth projection map to obtain regions to be completed, in Embodiment 1 of the present invention.

Step 4) Using a semantic segmentation module, as shown in FIG. 3, the neural network is trained with the RGB image CI and the depth map PCD to obtain a semantic segmentation result, and regions to be completed $L_j$ are obtained by the semantic segmentation module.

The semantic segmentation model may be any neural network with a prediction function and an image generation function, and the neural network may be pre-trained, or trained based on local data, and uses image semantic segmentation labels as supervision labels. Exemplarily, suppose that values on the labels are 10 integers from 0 to 9.

For the preprocessing process, considering that the depth image may provide more depth information, the input to the network includes the RGB image CI and the single-channel depth projection image PCD, and the images are both cropped to a size of (352,1216), such that the size of the single-channel depth projection image PCD is (352,1216,1), and the size of the three-channel RGB image is (352,1216,3), and features of the two images are stitched, such that the size of the input to the network is (352,1216,4). The size of a target output from the network is (352,1216,10), where 10 represents the total number of predicted categories in semantic segmentation. The value of each point on each layer of channel ranges from 0 to 1, and the sum of the values of the same point on 10 layers is 1.

During training of the neural network for semantic segmentation of the point cloud image, a softmax function is used as a classification function, and a cross-entropy function is used as a loss function:

$$Loss_{sementric} = -\frac{1}{n}\sum_{i=1}^{n}\sum_{j=1}^{m} C_{i,j}^* \log(C_{i,j})$$

$$C_{i,j} = \frac{e^{Z_{i,j}}}{\sum_m e^{Z_{i,j,m}}}$$

where n is the number of effective pixel points, m is the number of label categories of semantic segmentation, $C_{i,j}$ is a probability that a pixel point i belongs to the jth category based on the semantic segmentation, $C_{i,j}^*$ is a true probability that the pixel point i belongs to the jth category, and $Z_{i,j}$ is an output result of the pixel point i at the jth node of the last layer of the neural network.

Among 10 probability values of each pixel point, a category corresponding to the largest probability value is a corresponding label in the semantic segmentation, different semantics are differentiated based on different colors, and labeled regions with a same color are extracted to obtain the regions to be completed $L_j$.

Figure 4:
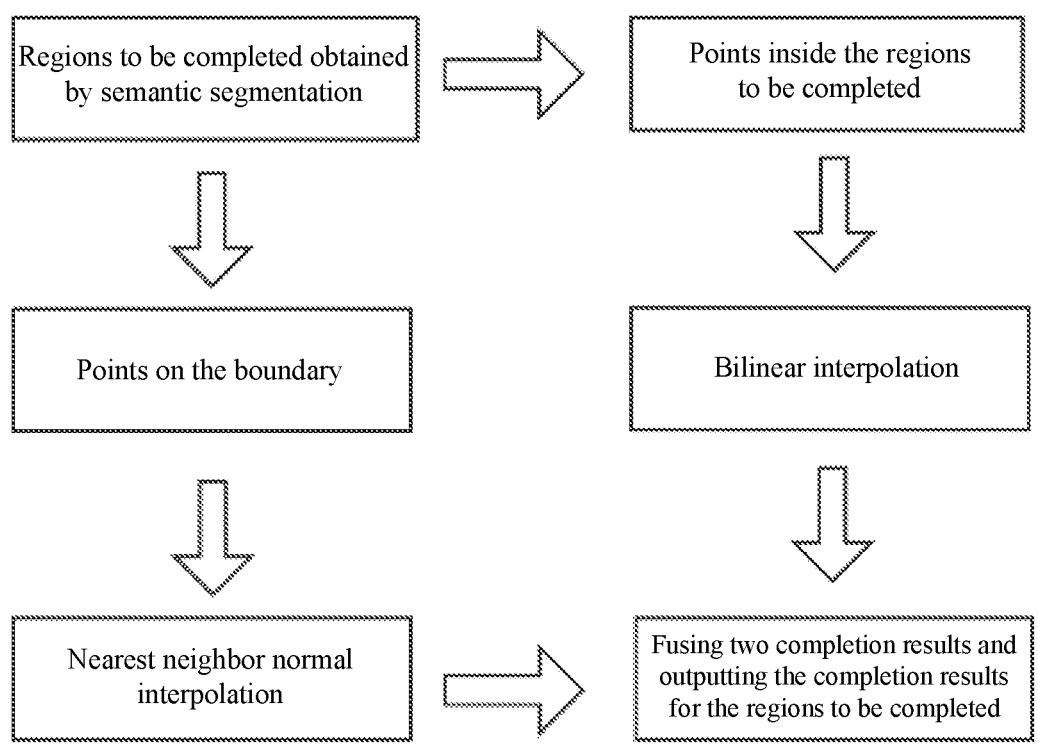
FIG. 4 is a flow diagram of fusing the regions to be completed and a coarse-grained reflection intensity projection map, and performing fine-grained reflection intensity completion for some regions by using an interpolation algorithm, in Embodiment 1 of the present invention.

Step 5) The regions to be completed $L_j$ are aligned with the reflection intensity projection map, i.e., under the guidance of the regions to be completed after semantic segmentation, the regions are aligned to the regions to be completed on the reflection intensity projection map, and a Mask image of the same size is created as an input, that is, points with reflection intensity values are denoted as 1, and points without reflection intensity values are denoted as 0. For the points denoted as 0 in the regions to be completed, completion is performed in two cases, as shown in FIG. 4, specifically including the following steps:

Step 501) Points on the boundary of each region to be completed are noted as (x,y), and reflection intensity values thereof are denoted as r(x,y). An edge is extracted from a semantic segmentation label map by using a canny operator of OpenCV™ as an edge of a completed region. Interpolation is performed by using two adjacent points on the edge and a point inside the region, the three points being denoted as $(x_1,y_1)$, $(x_2,y_2)$, and $(x_3,y_3)$, respectively, to obtain an interpolation result:

$$r(x,y) = \sum_{i=1}^{3} \frac{l_i}{\sum_{i=1}^{3} l_i} r(x_i, y_i), l_i = \sqrt{(x-x_i)^2 + (y-y_i)^2}$$

Step 502) For points denoted as 0 in each region to be complete $L_j$, interpolation is performed by using a bilinear interpolation method: suppose a pixel point is i, coordinates of which are (x,y) and a reflection intensity value of which is r(x,y). Two points nearest to the point are selected and may be set as $(x_1,y_1)$ and $(x_2,y_2)$, and a rectangular region is formed by expansion using the two points, and correspondingly, vertex positions of the rectangle are selected to be $(x_1,y_1)$, $(x_1,y_2)$ $(x_2,y_1)$, $(x_2,y_2)$, respectively, to obtain an interpolation result:

$$r(x,y) = \frac{1}{(x_2-x_1)(y_2-y_1)}[x_2-x \quad x-x_1]\begin{bmatrix} r(x_1,y_1) & r(x_1,y_2) \\ r(x_2,y_1) & r(x_2,y_2) \end{bmatrix}\begin{bmatrix} y_2-y \\ y-y_1 \end{bmatrix}$$

Embodiment 2

Based on the above method, a point cloud intensity completion system based on semantic segmentation is proposed in Embodiment 2 of the present invention, the method mainly including a photographic camera, a lidar, and four modules which are a point cloud data pre-processing module, a coarse-grained reflection intensity completion module, a semantic segmentation module, and a fine-grained reflection intensity completion module, wherein the photographic camera is configured to acquire an RGB image of a road surface;

the lidar is configured to synchronously acquire point cloud data of the road surface;

the point cloud data pre-processing module is configured to perform spatial transformation on a point cloud according to the lidar point cloud data, based on calibration results of the radar and the photographic camera, to generate a single-channel two-dimensional reflection intensity projection map and a single-channel two-dimensional depth projection map;

the coarse-grained reflection intensity completion module is configured to perform point cloud completion and reflection intensity completion by using a neural network based on the RGB image, the two-dimensional reflection intensity projection map, and the depth projection map as an input, and output a coarse-grained reflection intensity completion projection map;

the semantic segmentation module is configured to, based on the RGB image and the two-dimensional depth image as an input, determine regions to be completed according to categories by using the neural network, for fine-grained reflection intensity completion; and the fine-grained reflection intensity completion module is configured to output a final completed reflection intensity projection map according to edge features of some regions after semantic segmentation and the coarse-grained reflection intensity completion map input to the fine-grained completion module.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions of the technical solutions of the present invention should be encompassed within the scope of the claims of the present invention so long as they do not depart from the spirit and scope of the technical solutions of the present invention.

What is claimed:

1. A point cloud intensity completion method based on a semantic segmentation, comprising the steps of:
   step 1) acquiring an RGB image of a road surface by a photographic camera, and synchronously acquiring point cloud data of the road surface by a lidar;
   step 2) performing a spatial transformation on the point cloud data by using a conversion matrix between a lidar coordinate system and a photographic camera imaging coordinate system to generate a two-dimensional reflection intensity projection map and a two-dimensional depth projection map, wherein each pixel point in the two-dimensional reflection intensity projection map that corresponds to a point in the point cloud is referred to as an effective reflection pixel point and wherein each pixel point in the two-dimensional depth projection map that corresponds to a point in the point cloud is referred to as an effective depth pixel point;
   step 3) performing a feature stitching and a reflection intensity completion on the RGB image and the two-dimensional reflection intensity projection map to obtain a single-channel reflection intensity projection map; performing the feature stitching and a depth completion on the RGB image and the two-dimensional depth projection map to obtain a single-channel depth projection map; and performing a coarse-grained completion on the RGB image, the single-channel reflection intensity projection map and the single-channel depth projection map to obtain a two-dimensional coarse-grained reflection intensity projection map;
   step 4) performing the feature stitching and the semantic segmentation on the RGB image and the two-dimensional depth projection map to obtain a plurality of regions to be completed; and
   step 5) performing a fine-grained reflection intensity completion on the two-dimensional coarse-grained reflection intensity projection map according to the plurality of regions to be completed to obtain a two-dimensional reflection intensity projection completion map.

2. The point cloud intensity completion method according to claim 1, wherein step 2) specifically comprises:
   projecting the point cloud data to a two-dimensional image plane by using the conversion matrix between the lidar coordinate system and the photographic camera imaging coordinate system, wherein pixel values are reflection intensity values, to obtain the two-dimensional reflection intensity projection map; and
   projecting the point cloud data to a two-dimensional grayscale image plane by using the conversion matrix between the lidar coordinate system and the photographic camera imaging coordinate system, wherein pixel values are depth values, and vacant parts are filled with a value 0, to obtain the two-dimensional depth projection map, wherein a depth value $D_i^*$ of an ith point is:

$$D_i^* = \sqrt[2]{x_i^2 + y_i^2};$$

wherein $(x_i, y_i)$ is coordinate values of the ith point in the point cloud data.

3. The point cloud intensity completion method according to claim 1, wherein step 3) specifically comprises:
   step 301) cropping the RGB image to obtain a cropped first RGB image of a size (352,1216,3), cropping the two-dimensional reflection intensity projection map to obtain a cropped two-dimensional reflection intensity projection map of a size (352,1216,1), and performing the feature stitching on the cropped first RGB image and the cropped two-dimensional reflection intensity projection map to obtain a two-dimensional reflection intensity stitched image of a size (352,1216,4);
   step 302) inputting the two-dimensional reflection intensity stitched image into a pre-built and trained coarse-grained reflection intensity completion sub-model to obtain the single-channel reflection intensity projection map;
   step 303) cropping the RGB image to obtain a cropped second RGB image of the size (352,1216,3); cropping the two-dimensional depth projection map to obtain a cropped two-dimensional depth projection map of a size (352,1216,1); and performing the feature stitching on the cropped second RGB image and the cropped two-dimensional depth projection map to obtain a two-dimensional depth stitched image of the size (352, 1216,4);
   step 304) inputting the two-dimensional depth stitched image into a pre-built and trained depth completion sub-model to obtain the single-channel depth projection map; and
   step 305) performing a coarse-grained reflection intensity fusion on the RGB image, the single-channel reflection intensity projection map, and the single-channel depth projection map, to obtain the two-dimensional coarse-grained reflection intensity projection map.

4. The point cloud intensity completion method according to claim 3, wherein an input to the pre-built and trained coarse-grained reflection intensity completion sub-model is the two-dimensional reflection intensity stitched image of the size (352,1216,4), and an output from the two-dimensional depth stitched image is the single-channel reflection intensity projection map of the size (352,1216,1), the pre-built and trained coarse-grained reflection intensity completion sub-model is a self-supervised model comprising an encoder and a decoder both with a ResNet network structure, wherein in the ResNet network structure an activation function is a ReLU function, and a loss function Loss', on a reflection intensity is:

$$Loss_{rc} = \frac{1}{n}\sum_i \|R_i - R_i^*\|_2^2;$$

wherein n is a number of effective reflection pixel points in the cropped two-dimensional reflection intensity projection map comprising the two-dimensional reflection intensity stitched image, i is the index of an effective reflection pixel point, $R_i$ is a value of the reflection intensity of an effective reflection point i predicted by the coarse-grained reflection intensity completion sub-model, and $R_i^*$ is a truth value of the reflection intensity of the point i.

5. The point cloud intensity completion method according to claim 4, wherein an input to the pre-built and trained depth completion sub-model is the two-dimensional depth stitched image of the size (352,1216,4), and an output from the two-dimensional depth stitched image is the single-channel depth projection map of the size (352,1216,1), the pre-built and trained depth completion sub-model is another self-supervised model comprising the encoder and the decoder both with the ResNet network structure, wherein in the ResNet structure the activation function is the ReLU function, and with a surface normal as an intermediate constraint, a depth completion loss function $Loss_{dc}$ is:

$$Loss_{dc} = \lambda_1 Loss_{normal} + \lambda_2 Loss_{depth};$$

wherein $Loss_{normal}$ is a loss function of an intermediate constraint surface normal, $Loss_{depth}$ is a loss function of depth, $\lambda_1$ is a weight of $Loss_{normal}$ and $\lambda_2$ is a weight of $Loss_{depth}$, $$Loss_{normal} = \frac{1}{n}\sum_i N_i - N_i^*;$$

$$Loss_{depth} = \frac{1}{n}\sum_i d_i^2 - \frac{1}{2n^2}\left(\sum_i d_i\right)^2 + \frac{1}{n}\sum_i [(\nabla_x d_i)^2 + (\nabla_y d_i)^2];$$

$$d_i = D_i - D_i^*;$$

wherein $N_i$ is a predicted value of a surface normal of the pre-built and trained depth completion sub-model, $N_i^*$ is a true value of the surface normal, n is a total number of effective depth pixel points in the cropped two-dimensional depth projection map comprising the two-dimensional depth stitched image, i is the index of an effective depth pixel point, $D_i$ is a depth value of an i th point predicted by the pre-built and trained depth completion sub-model, $D_i^*$ is a depth true value of the i th point, $d_i$ is an error between the depth true value the i th point and the depth value predicted by the pre-built and trained depth completion sub-model, $\nabla_x d_i$ is a derivative of $d_i$ with respect to a direction x, and $\nabla_y d_i$ is a derivative of $d_i$ with respect to a direction y.

6. The point cloud intensity completion method according to claim 5, wherein the coarse-grained reflection intensity fusion uses the following loss function:

$$Loss = Loss_{dc} + \lambda_3 Loss_{rc}$$

wherein $\lambda_3$ is a weight coefficient of the loss function $Loss_{rc}$ on the reflection intensity.

7. The point cloud intensity completion method according to claim 1, wherein step 5) specifically comprises:
aligning the plurality of regions to be completed with the two-dimensional coarse-grained reflection intensity projection map;
creating reflection intensity to-be-completed regions, with region boundaries being defined by a segmentation label map resulted from the semantic segmentation, wherein points corresponding to effective reflection pixel points are assigned a value of 1 and points corresponding to non-effective reflection pixel points are assigned a value of 0;
let (x,y) be the coordinates of a non-effective reflection pixel point P and r(x,y) a reflection intensity value to be computed for P:
when the pixel point P is a point on a boundary of a reflection intensity to-be-completed region, extracting an edge from the semantic segmentation label map by using a canny operator of OpenCV™ as an edge of a reflection intensity to-be-completed region, and performing an interpolation by using two adjacent points on the edge and a point inside the reflection intensity to-be-completed region denoted as $(x_1,y_1)$ $(x_2,y_2)$, and $(x_3,y_3)$, respectively, to obtain an interpolation result:

$$r(x, y) = \sum_{i=1}^{3} \frac{l_i}{\sum_{i=1}^{3} l_i} r(x_i, y_i), l_i = \sqrt{(x-x_i)^2 + (y-y_i)^2};$$

and
when the pixel point P is a point inside the plurality of a reflection intensity to-be-completed region, performing the interpolation using a bilinear interpolation method: selecting two points $(x_1,y_1)$ and $(x_2,y_2)$ nearest to the pixel point P and forming a rectangular region by expansion using two points, and correspondingly, selecting vertex positions of a rectangle, $(x_1,y_1)$, $(x_1,y_2)$, $(x_2,y_1)$, $(x_2,y_2)$, respectively, to obtain the interpolation result:

$$r(x, y) = \frac{1}{(x_2-x_1)(y_2-y_1)}[x_2-x \quad x-x_1]\begin{bmatrix} r(x_1, y_1) & r(x_1, y_2) \\ r(x_2, y_1) & r(x_2, y_2) \end{bmatrix}\begin{bmatrix} y_2-y \\ y-y_1 \end{bmatrix}.$$

* * * * *